United States Patent
de Mersseman et al.

(10) Patent No.: US 12,511,917 B2
(45) Date of Patent: Dec. 30, 2025

(54) DRIVER MONITORING SYSTEMS AND METHODS WITH INDIRECT LIGHT SOURCE AND CAMERA

(71) Applicant: MAGNA ELECTRONICS, LLC, Southfield, MI (US)

(72) Inventors: Bernard de Mersseman, Andover, MA (US); Olof Eriksson, Alvsjo (SE)

(73) Assignee: MAGNA ELECTRONICS, LLC, Southfield, MI (US)

( * ) Notice: Subject to any disclaimer, the term of this patent is extended or adjusted under 35 U.S.C. 154(b) by 92 days.

(21) Appl. No.: 17/710,019

(22) Filed: Mar. 31, 2022

(65) Prior Publication Data
US 2023/0316782 A1    Oct. 5, 2023

(51) Int. Cl.
| | |
|---|---|
| H04N 5/225 | (2006.01) |
| B60Q 3/233 | (2017.01) |
| B60Q 5/00 | (2006.01) |
| B60Q 9/00 | (2006.01) |
| B60R 1/29 | (2022.01) |
| G02B 5/20 | (2006.01) |
| G02B 5/30 | (2006.01) |
| G06V 20/59 | (2022.01) |
| G06V 40/18 | (2022.01) |
| H04N 23/56 | (2023.01) |

(52) U.S. Cl.
CPC ............. *G06V 20/59* (2022.01); *B60Q 3/233* (2017.02); *B60Q 5/005* (2013.01); *B60Q 9/00* (2013.01); *B60R 1/29* (2022.01); *G02B 5/208* (2013.01); *G02B 5/3025* (2013.01); *G02B 5/3083* (2013.01); *G06V 40/18* (2022.01); *H04N 23/56* (2023.01)

(58) Field of Classification Search
CPC ........ H04N 23/56; G06V 20/59; G06V 40/18; B60Q 3/233; B60Q 5/005; B60Q 9/00; G60R 1/29; G02B 5/208; G02B 5/3083
See application file for complete search history.

(56) References Cited

U.S. PATENT DOCUMENTS

| | | | | |
|---|---|---|---|---|
| 4,871,917 A | * | 10/1989 | O'Farrell | G01N 21/43 250/341.7 |
| 5,005,010 A | * | 4/1991 | Misaki | G02B 27/01 340/980 |
| 5,090,302 A | * | 2/1992 | Eisenbeisz | F24S 20/63 454/236 |
| 10,277,837 B2 | | 4/2019 | Madau et al. | |
| 2003/0169213 A1 | * | 9/2003 | Spero | G02B 27/01 345/7 |

(Continued)

FOREIGN PATENT DOCUMENTS

| | | | | |
|---|---|---|---|---|
| CN | 109343223 A | * | 2/2019 | ............ B60R 1/001 |
| DE | 102006019112 A1 | | 10/2007 | |

(Continued)

OTHER PUBLICATIONS

International Search Report and Written Opinon for International Application No. PCT/US2023/011395 mailed Apr. 24, 2023.

*Primary Examiner* — Jonathan R Messmore

(57) ABSTRACT

A driver monitoring system of a vehicle includes: an infrared (IR) camera configured to, via a windshield, capture an image of a driver on a driver's seat within a passenger cabin of the vehicle; and an IR light source configured to transmit IR light directly toward the driver and the driver's seat.

15 Claims, 12 Drawing Sheets

(56) References Cited

U.S. PATENT DOCUMENTS

| | | | | |
|---|---|---|---|---|
| 2013/0250421 A1* | 9/2013 | Wakabayashi | ....... | G02B 5/3025 |
| | | | | 359/576 |
| 2015/0124068 A1* | 5/2015 | Madau | ................. | G08B 21/06 |
| | | | | 29/428 |
| 2015/0294169 A1 | 10/2015 | Zhou et al. | | |
| 2016/0119527 A1* | 4/2016 | Shahid | ................. | H04N 23/56 |
| | | | | 348/148 |
| 2017/0210289 A1* | 7/2017 | Dhawan | ................ | A61B 3/113 |
| 2018/0335633 A1* | 11/2018 | Naruse | ................... | G06F 3/038 |
| 2019/0034743 A1 | 1/2019 | Chauveau et al. | | |
| 2019/0092346 A1* | 3/2019 | Odate | ................... | B62D 6/007 |
| 2019/0147261 A1* | 5/2019 | Hoshina | ................ | G10L 15/22 |
| | | | | 382/118 |
| 2020/0379226 A1* | 12/2020 | Steiner | ................ | G02B 5/3083 |
| 2022/0033651 A1* | 2/2022 | Kang | ................... | C08K 5/0041 |
| 2022/0413286 A1* | 12/2022 | Pankratz | ............. | G02B 5/3066 |
| 2023/0060404 A1* | 3/2023 | Herbig | .................. | G06V 40/19 |

FOREIGN PATENT DOCUMENTS

| | | |
|---|---|---|
| DE | 102019210817 A1 | 1/2021 |
| FR | 3073053 A1 | 5/2019 |

* cited by examiner

DRIVER MONITORING SYSTEMS AND METHODS WITH INDIRECT LIGHT SOURCE AND CAMERA

FIELD

The present disclosure relates to vehicle driver monitoring systems and methods and more particularly to driver monitoring systems and methods involving indirect light sources and image capture.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Driver monitoring systems of vehicles include a camera that faces the driver of a vehicle. Images from the camera are used during driving to monitor for alertness of the driver. Driver monitoring systems may also determine how actively the driver is paying attention to the environment in front of the vehicle.

The camera may be, for example, mounted on a steering wheel column of the vehicle or in another suitable location. Images from the camera may be used to monitor driver fatigue. When fatigue or a lack of attention of the driver is detected, the driver may be alerted.

SUMMARY

In a feature, a driver monitoring system of a vehicle includes: an infrared (IR) camera configured to, via a windshield, capture an image of a driver on a driver's seat within a passenger cabin of the vehicle; and an IR light source configured to transmit IR light directly toward the driver and the driver's seat.

In further features, the IR camera is disposed below a top surface of a dashboard of the vehicle and configured to capture the image through an aperture in the top surface of the dashboard.

In further features, the IR light source is disposed at least partially below the top surface of the dashboard.

In further features, the IR camera has an angle of incidence of approximately 54-64 degrees with respect to the windshield.

In further features, an IR reflective film is disposed on the windshield and configured to: reflect light from within the passenger cabin toward the IR camera.

In further features, the IR film is disposed between inner and outer layers of glass of the windshield.

In further features, the IR film is disposed on an inner surface of an inner layer of glass of the windshield.

In further features, the IR film includes a coating for s-polarized light.

In further features, the IR film includes a coating for p-polarized light.

In further features, the IR film has an R value of at least 80 percent for near IR light.

In further features, the IR camera includes a filter on a lens of the camera.

In further features, the filter includes a p-polarized filter.

In further features, the filter includes quarter waveplate circular polarization.

In further features, at least one of: a second IR light source is configured to transmit IR light directly toward the driver and the driver's seat; and a third IR light source is configured to transmit light indirectly toward the driver via the windshield.

In further features: a gaze module is configured to determine a gaze of the driver based on the image from the IR camera; and a monitor module is configured to determine whether a location where the gaze of the driver intersects a vertical plane in front of the driver is within an area on the vertical plane.

In further features: the monitor module is configured to increment a timer value when the location where the gaze of the driver intersects the vertical plane in front of the driver is outside of the area on the vertical plane; and the driver monitoring system further includes an alert module configured to output an alert to the driver when the timer value is greater than a predetermined value.

In further features, the alert module is configured to at least one of: output a visual alert via one or more visual output devices; output an audible alert via one or more speakers; and output a haptic alert via one or more vibrating devices.

In a feature, a driver monitoring method for a vehicle includes: by an infrared (IR) camera, via a windshield, capturing an image of a driver on a driver's seat within a passenger cabin of the vehicle; and by an IR light source, transmitting IR light directly toward the driver and the driver's seat.

In further features, the driver monitoring method further includes, by an IR reflective film disposed on the windshield, reflecting light from within the passenger cabin toward the IR camera.

In further features, the driver monitoring method further includes: determining a gaze of the driver based on the image from the IR camera; and determining whether a location where the gaze of the driver intersects a vertical plane in front of the driver is within an area on the vertical plane.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Driver monitoring systems (DMS) of vehicles determine whether a gaze of a driver of a vehicle is within an area to determine whether the driver's attention is on the road in front of the vehicle. Such DMS can assess awareness of the driver to the surroundings and assist the driver in responding in a more timely and efficient manner. The gaze of the driver is determined using at least one infrared (IR) light source and at least one IR camera, such as a near IR camera. The IR light source could be arranged to output IR light directly to the diver, and the IR camera could be arranged to capture images of the driver directly. For example, the camera may be, located on a steering column of the vehicle or on or in a center console of the vehicle.

The present application involves one or more IR light source(s) and the IR camera being concealed from view and separated. The IR camera is disposed below a dashboard of the vehicle. The IR light source(s) directly outputs light toward the driver and within the passenger cabin. The IR camera indirectly captures images including the driver and the passenger cabin. For example, the IR camera output light to and capture images of the driver via the reflection on windshield.

Figure 1:
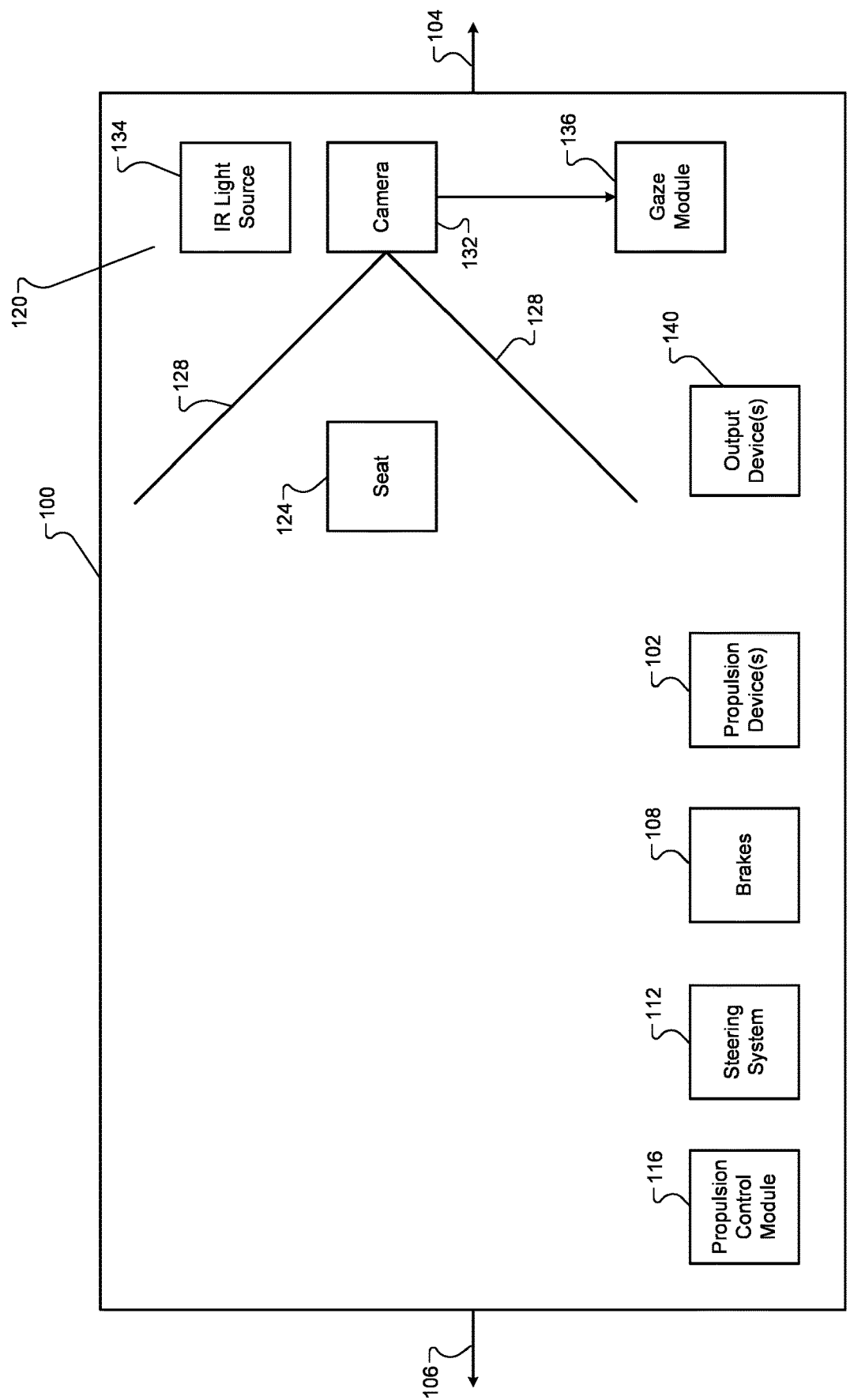
FIG. 1 is a functional block diagram of an example implementation of a vehicle.

FIG. 1 is a functional block diagram of an example vehicle 100 including one or more propulsion devices. The vehicle 100 may be a vehicle including an internal combustion engine, an electric vehicle including one or more electric motors not including an internal combustion engine, a hybrid vehicle including an electric motor and an internal combustion engine, or another suitable type of vehicle. The vehicle 100 may be an autonomous vehicle, a non-autonomous vehicle, or a semiautonomous vehicle. The vehicle 100 may be a ride share vehicle or may be a non-shared vehicle.

The vehicle 100 includes one or more propulsion devices 102, such as at least one of an electric motor and an internal combustion engine, that generate propulsion torque that is used to propel the vehicle 100. Forward and backward directions of the vehicle 100 are illustrated by arrows 104 and 106. The vehicle 100 includes mechanical (friction) brakes 108 that decelerate the vehicle 100 when actuated. The vehicle 100 includes a steering system 112 that steers the vehicle 100 when actuated. The steering system 112 may be, for example, an electric power steering system or another suitable type of steering system.

A propulsion control module 116 controls the steering system 112, the brakes 108, and the propulsion device(s) 102. The propulsion control module 116 may control positive torque output from the propulsion device(s) 102 based on at least one of (a) an accelerator pedal position and (b) autonomous or semiautonomous driving input. The propulsion control module 116 may control actuation of the brakes 108 based on at least one of (a) a brake pedal position and (b) autonomous or semiautonomous driving input. The propulsion control module 116 may control actuation of the steering system 112 based on at least one of (a) a steering wheel angle and (b) autonomous or semiautonomous driving input. For example, the propulsion control module 116 may actuate the steering system 112 to maintain the vehicle 100 between lane lines of a present lane.

The vehicle 100 includes a passenger cabin 120. A driver's seat 124 is disposed within the passenger cabin 120. While only the driver's seat 124 is shown for simplicity, one or more additional seats may also be disposed within the passenger cabin 120.

The driver's seat 124 is disposed within a field of view (FOV) 128 of a camera 132. While an example horizontal FOV is shown, the FOV 128 may be greater than or lesser than the example FOV shown. Because the driver's seat 124 is disposed within the FOV 128, a portion of a driver (at least including eyes of the driver) sitting on the driver's seat 124 is captured in images captured by the camera 132.

The camera 132 is an infrared (IR) camera such as a near IR camera. The IR wavelength of the camera 132 may be between 850 nanometers (nm) and 1700 nm, such as 940 nm, 1350 nm, 1550 nm, or another suitable IR wavelength. An IR light source 134, such as a near IR light source, outputs IR light onto eyes of the driver. In addition to capturing the driver, the camera 132 captures the IR light output by the IR light source 134. The camera 132 may have a focal length of 20 mm or another suitable value and a F number of 4 or another suitable value. The camera 132 may have a horizontal FOV of approximately 50 degrees and a vertical FOV of approximately 30 degrees or other suitable FOVs. The camera 132 may have a resolution of approximately 1280 horizontal pixels and 960 vertical pixels or another suitable resolution. The camera 132 may have a portable network graphics (PNB) rating of 8 bits or another suitable rating.

A gaze module 136 identifies eyes of the driver and pupils of the eyes, respectively. The gaze module 136 determines a gaze vector indicating a direction of the pupils of the driver based on the light output by the IR light source 134 captured in an image from the camera 132. The gaze is used to determine whether the driver is looking within a driver monitoring system (DMS) area while the vehicle is moving in the forward direction. The DMS area is an area on a vertical plane in front of the vehicle 100. In various implementations, two or more cameras may be implemented, or a camera unit may include two or more cameras. For example, a single imaging sensor can include two cameras in a stereo camera implementation. The light source 134 may be a CW light source or modulated, such as for interference rejection or indirect time of flight measurement, such as in the case of a range gated imager.

Figure 2:
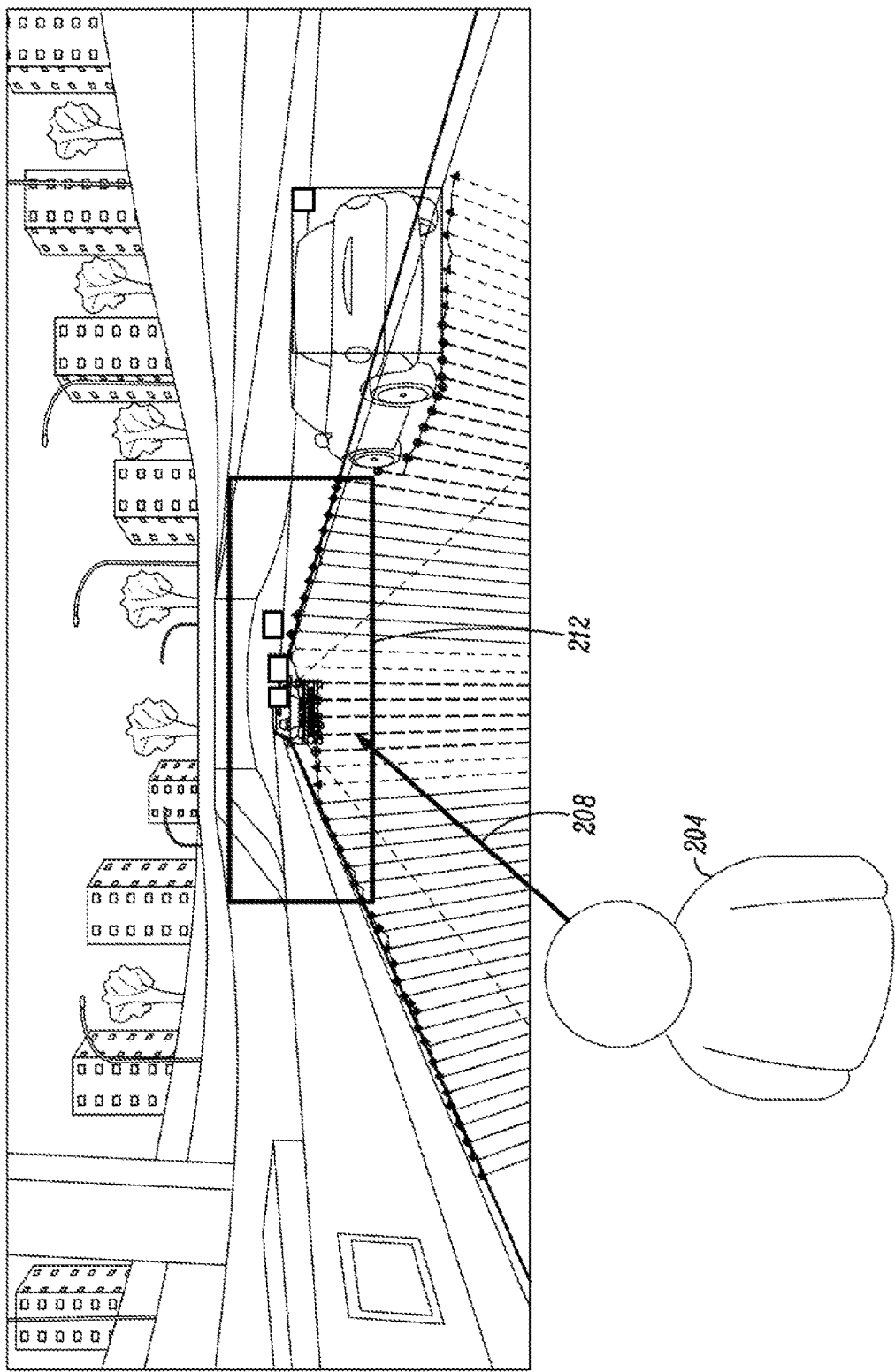
FIG. 2 includes an example illustration of a driver and a gaze of the driver and a fixed area.

FIG. 2 includes an example illustration of a driver 204 and a gaze (e.g., angle) 208 determined by the gaze module 136. An example DMS area 212 is illustrated. In the example of FIG. 2, the gaze 208 intersects the DMS area 212. The gaze of the driver 204 is therefore within the DMS area 212. The gaze of the driver 204 being outside of the DMS area may indicate that the driver is not monitoring the road in front of the vehicle.

One or more actions may be taken when the gaze of the driver 204 is outside of the DMS area for a first predetermined period. For example, one or more outputs may be generated by one or more output devices 140 (FIG. 1). For example, one or more visual outputs may be visually output via one or more visual output devices (e.g., displays, lights, indicators, etc.). Visual indicators may be shown as a headup information (e.g., a head up display) where the optimal information position on the windscreen may be set based on the driver eye gaze. Additionally or alternatively, one or more audible outputs may be audibly output via one or more speakers. Additionally or alternatively, the one or more haptic outputs may be output via one or more vibrating devices (e.g., in steering wheel, in seat, etc.). When the gaze of the driver is outside of the DMS area for a second predetermined period, one or more additional actions may be taken. For example, the propulsion control module 116 may at least one of decrease torque output of the propulsion device(s) 102, apply the brakes 108, and adjust the steering (e.g., to move the vehicle to a shoulder).

The DMS area may be a fixed or variable area on a vertical plane that is N units of distance (e.g., meters or feet) in front of (more forward than) the vehicle (e.g., the windshield). N may be an integer greater than or equal to zero.

Figure 3:
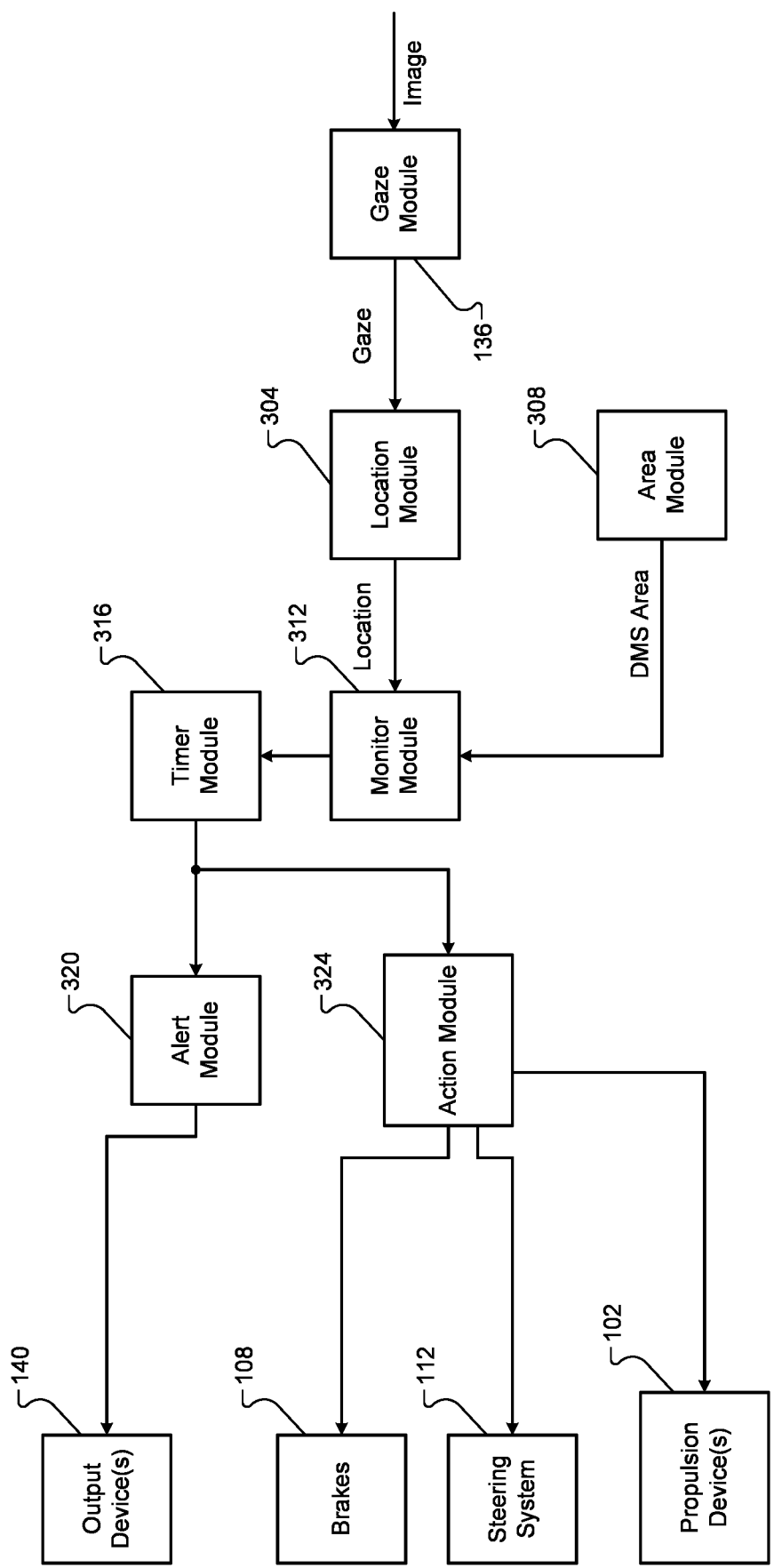
FIG. 3 is a functional block diagram of a driver monitoring system (DMS) of a vehicle.

FIG. 3 is a functional block diagram of a driver monitoring system (DMS) of the vehicle. The gaze module 136 determines the (present) gaze of the driver using an image from the camera 132. A location module 304 determines the location (e.g., horizontal and vertical coordinates) of where the gaze of the driver intersects the vertical plane on which the DMS area lies. For example, the gaze may be used to generate a three dimensional linear equation, and the location may be determined by the location module 304 based on the gaze and the location of the vertical plane.

An area module 308 determines the DMS area on the vertical plane. The DMS area may be fixed or variable in location and/or size. The DMS area may be rectangular, such as in the example of FIG. 2.

A monitor module 312 determines whether the location where the gaze intersects the vertical plane of the DMS area is within the DMS area. When the location is within the DMS area, the monitor module 312 resets a timer value of a timer module 316. When the location is outside of the DMS area, the monitor module 312 increments the timer value (e.g., by 1). As such, the timer value tracks the period that the gaze of the driver has been outside of the DMS area.

An alert module 320 outputs one or more alerts of inattention to the driver via the output device(s) 140 when the timer value is greater than a first predetermined value. In other words, the alert module 320 outputs one or more alerts to the driver when the period that the gaze of the driver has been outside of the DMS area is greater than a first predetermined period. The first predetermined period may be, for example, approximately 3 seconds or another suitable period.

An action module 324 may take one or more actions when the timer value is greater than a second predetermined value. In other words, the action module 324 may take one or more actions when the period that the gaze of the driver has been outside of the DMS area is greater than a second predetermined period. The second predetermined period is greater than the first predetermined period and may be, for example, approximately 6 seconds or another suitable period. For example, the action module 324 may at least one of (a) decrease torque output of the propulsion device(s) 102, (b) actuate (apply) the brakes 108, and (c) adjust steering of the vehicle 100.

Figure 4:
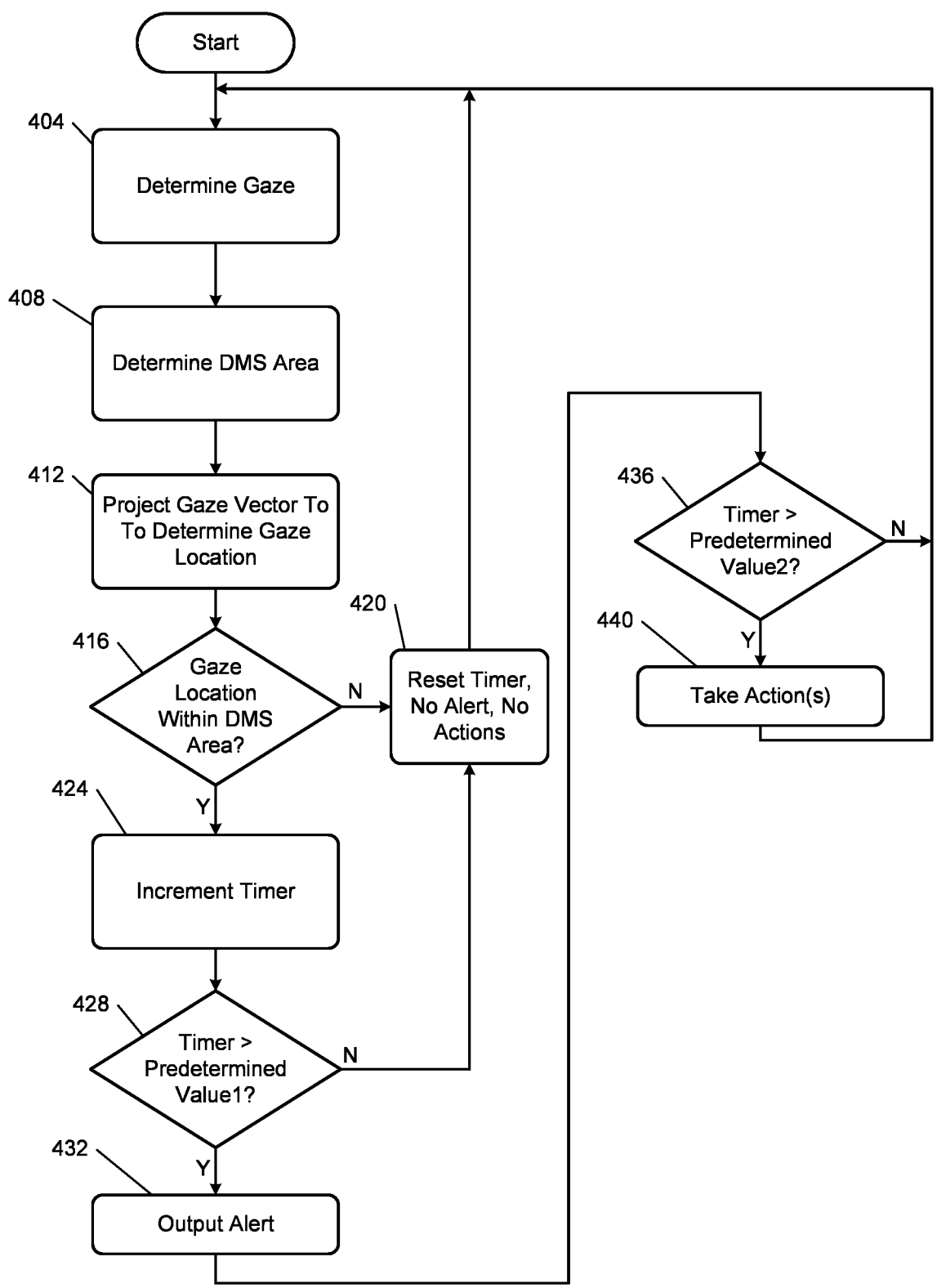
FIG. 4 is a flowchart depicting an example method of selectively taking one or more actions based on a gaze of a driver.

FIG. 4 is a flowchart depicting an example method of determining the gaze of the driver and selectively taking one or more actions. Control begins with 404 when the vehicle 100 is moving in the forward direction. At 404, the gaze module 136 receives an image from the camera 132 and determines a gaze for the driver as discussed herein.

At 408, the area module 308 determines the DMS area. At 412, the location module 304 determines the location where the gaze of the driver intersects the vertical plane of the DMS area. At 416, the monitor module 312 determines whether the location is within the DMS area. In other words, the monitor module 312 determines whether the gaze of the driver is within the DMS area. If 416 is false, the monitor module 312 resets the timer value (e.g., to zero) at 420. No alerts may be output and no actions may be taken at 420, and control returns to 404. If 416 is true, the monitor module 312 increments the timer value (e.g., by 1) at 424. While the example of an alert module is provided, the monitor module 312 may monitor the awareness of the driver to his or her surroundings, such as to act more effectively and/or sooner.

At 428, the alert module 320 determines whether the timer value is greater than the first predetermined value (Predetermined value 1). In other words, the alert module 320 determines whether the period since the driver's gaze left the DMS area is greater than the first predetermined period. If 428 is false, control transfers to 420, as discussed above. If 428 is true, control continues with 432.

At 432, the alert module 320 outputs one or more alerts via the output device(s) 140. This alerts the driver to the lack of attention to the road (the DMS area) in front of the vehicle 100. Control continues with 436.

At 436, the action module 324 determines whether the timer value is greater than the first predetermined value (Predetermined value 2). In other words, the action module 324 determines whether the period since the driver's gaze left the DMS area is greater than the second predetermined period. If 436 is false, control returns to 404 for a next set of images. If 436 is true, the action module 324 takes one or more actions at 440, such as at least one of decreasing torque output of the propulsion device(s) 102, applying the brakes 108, and steering the vehicle 100. Control returns to 404 for a next set of images. The camera may output images at a predetermined rate, such as 60 hertz (Hz) or another suitable rate.

According to the present application, the camera 132 captures images of the driver indirectly, and the IR light source 134 outputs light to the driver indirectly. The camera 132 and the IR light source 134 are concealed from view, such as from the driver's view.

Figure 5:
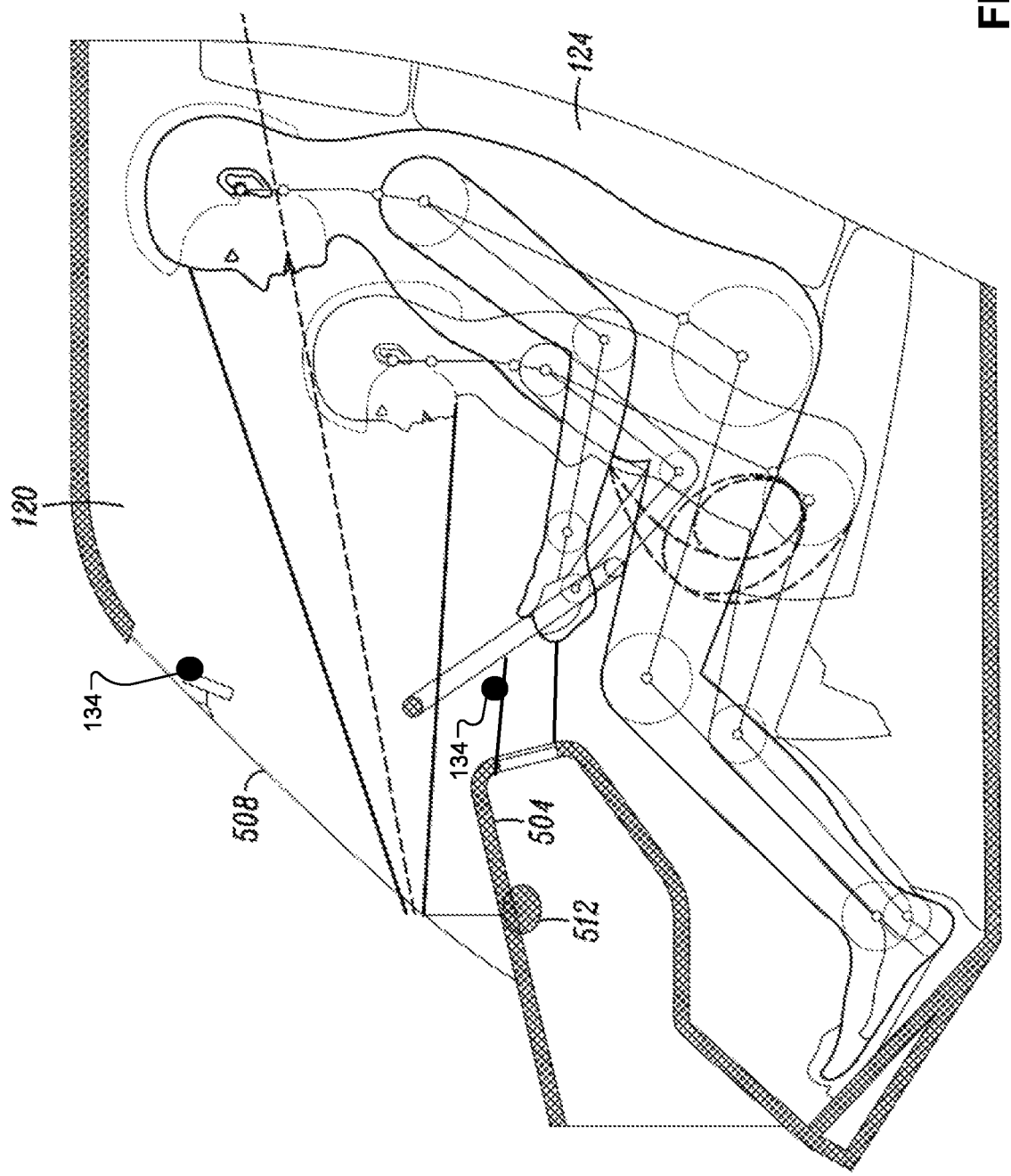
FIG. 5 is a side view of an example portion of the vehicle and the passenger cabin.

FIG. 5 is a side view of an example portion of the vehicle 100 and the passenger cabin. The driver looks over a dashboard 504 through a windshield 508 to view the environment in front of the vehicle 100.

The IR light source 134 and the camera 132 may be collectively illustrated by 512 in FIG. 5. The camera 132 is disposed at least partially below a top surface of the dashboard 504. In various implementations, the camera 132 may be disposed completely below the top surface of the dashboard 504. In this manner, the camera 132 is at least partially and may be completely concealed from the view of the driver.

One or more IR light sources 134 can output light directly toward the driver. The IR light source(s) 134 can be located in various different locations, such as near a rear view mirror, on a steering column, and/or in one or more other locations. The IR light source(s) can be concealed behind trim, behind the dashboard, or rearview mirror for example.

Figure 6:
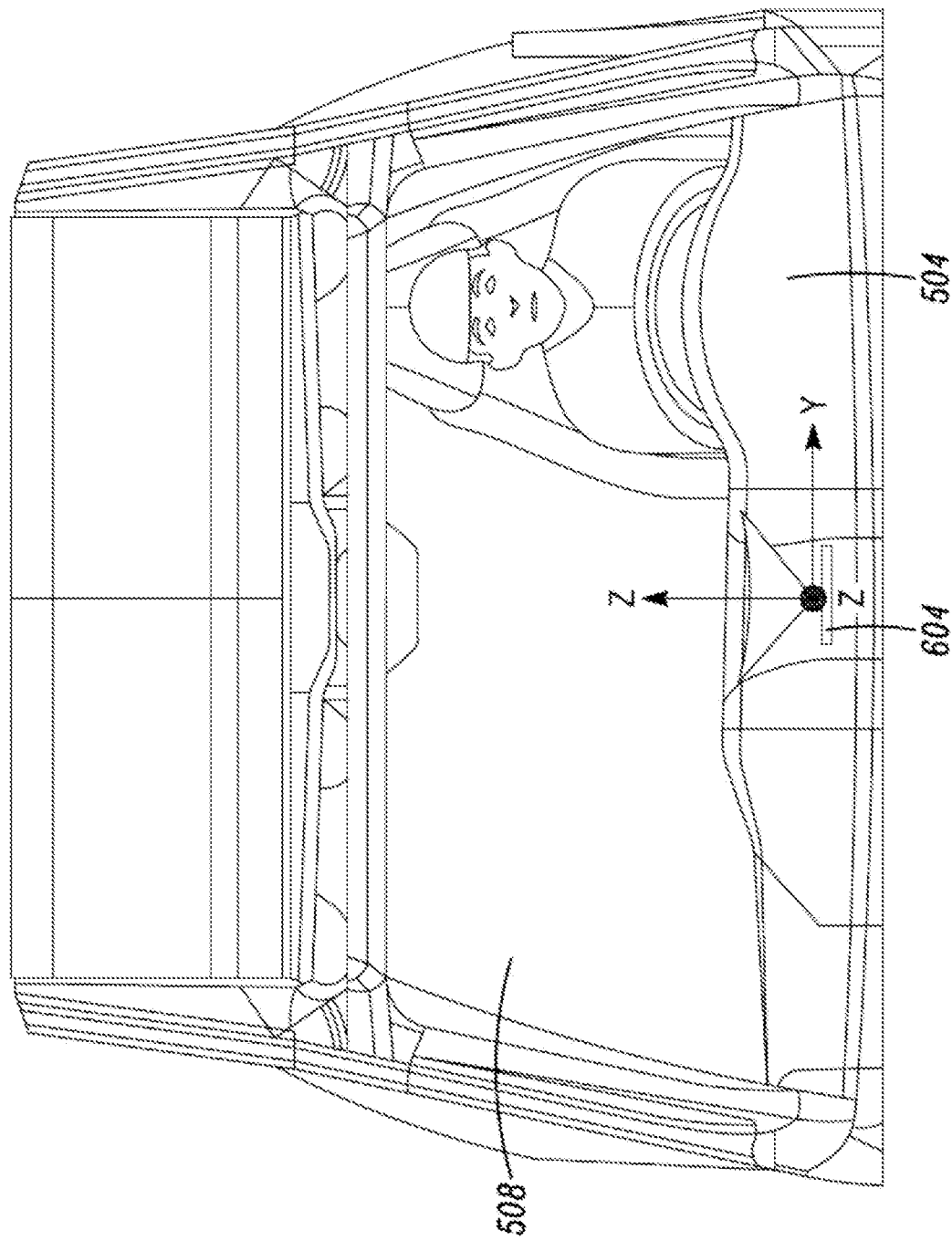
FIG. 6 is a front perspective view of the vehicle.

The IR light source 134 may output light through an aperture in the top surface of the dashboard 504 onto the windshield 508. An example aperture 604 is shown in FIG. 6, which is a front perspective view of an example vehicle.

The windshield 508 may reflect the light from the IR light source 134 onto the driver. The windshield 508 reflects the image of the passenger cabin to the camera 132. The camera 132 captures an image of the driver via the windshield 508. While an example location and dimensions of the aperture 604 are shown, the present application is also applicable to other aperture (and IR light source and camera) locations and other aperture dimensions. With the arrangement shown in FIG. 6, however, the camera 132 may capture images of both the driver, a passenger on a passenger seat, and/or other objects in the passenger cabin.

Figure 7:
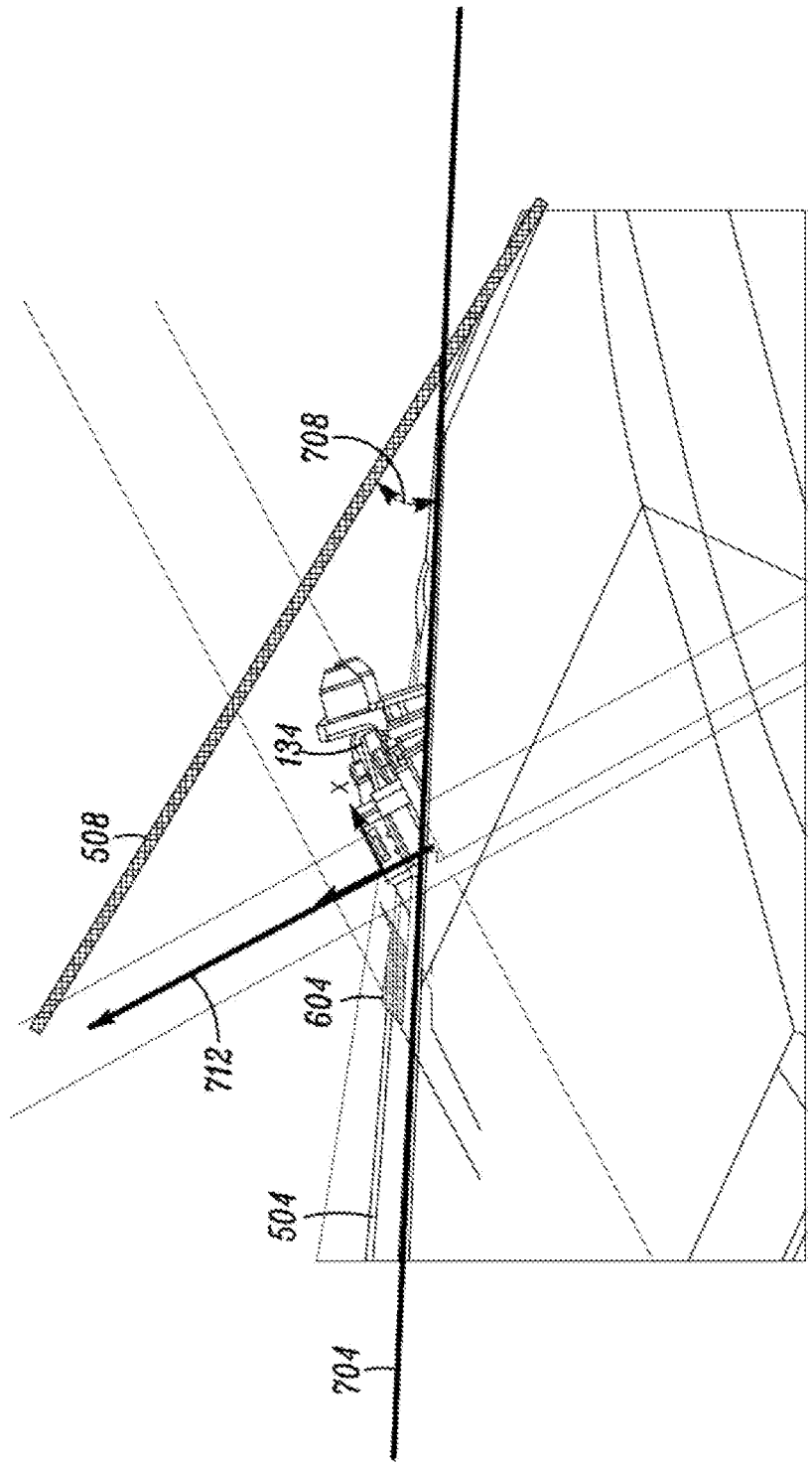
FIG. 7 is a side perspective view including an example implementation of the IR light source viewed from the driver's side of the vehicle.

FIG. 7 is a side perspective view including an example implementation of the IR light source 134 viewed from the driver's side of the vehicle. 704 represents the plane of the top surface of the dashboard 504 at the location of the aperture 604. An angle 708 between the plane 704 and the windshield 508 may be approximately 62 degrees or another suitable angle. 712 may denote a direction (e.g., axial) of the camera 132, although the present application is also applicable to other directions.

Figure 8:
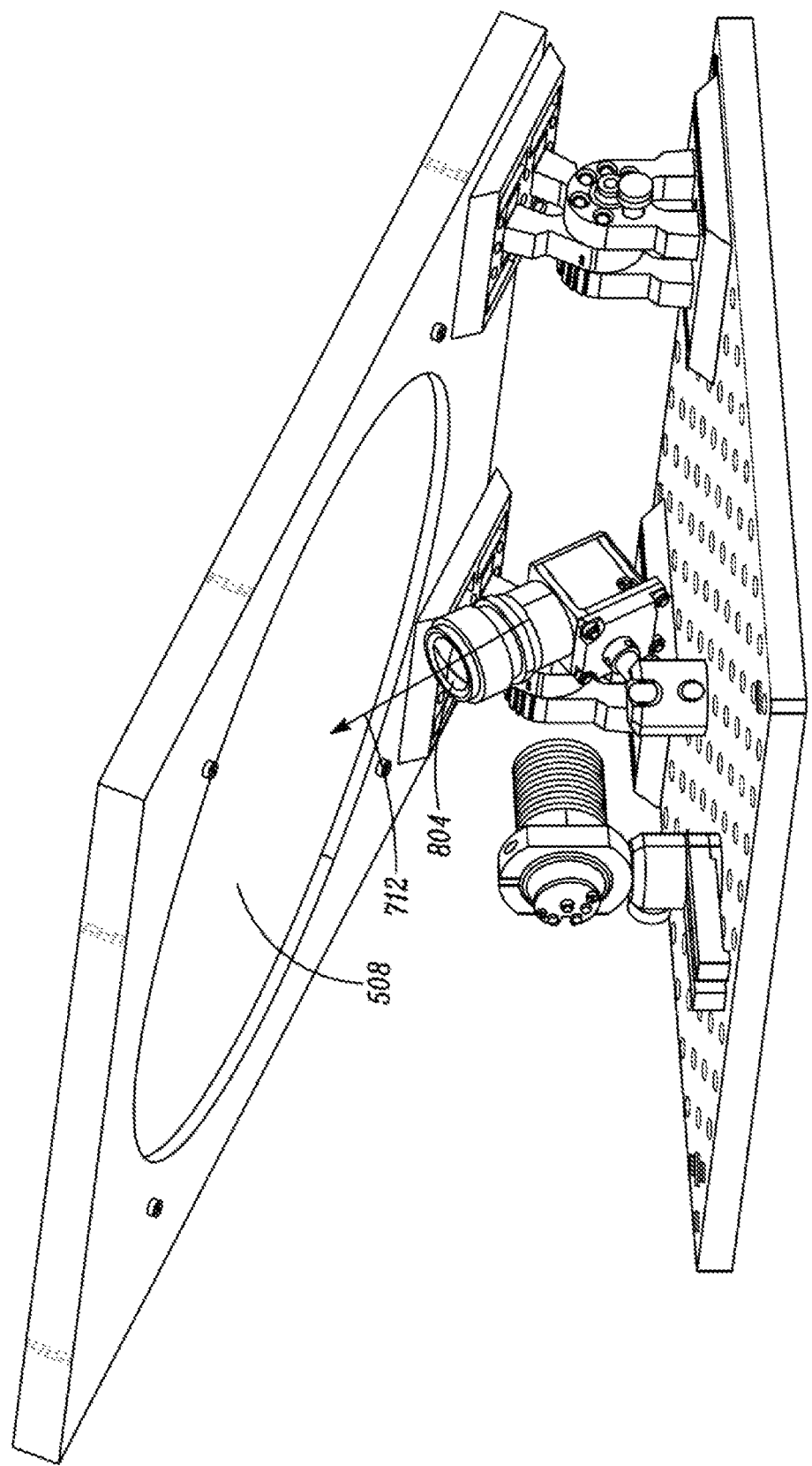
FIG. 8 is a perspective view including an example implementation of the camera from below the top surface of a dashboard.

FIG. 8 is a perspective view including an example implementation of the camera 132 from below the top surface of the dashboard 504. As illustrated, the camera 132 may be arranged such that its lens points upwardly to capture images via the windshield 508. The camera 132 may be disposed entirely below the top surface of the dashboard 504. The camera 132 may include a film, such as a filter on a lens 804 of the camera 132. The filter may be, for example, a p polarized filter or another suitable type of filter. The direction 712 of the camera 132 may be at the Brewster angle at the IR wavelength (e.g., 940 nm) of the camera 132. The film may, for example, reflect sunlight that passes through the windshield 508 and to the camera 132. The film may reduce sun glare when the sun is above the vehicle. The film may include, for example, quarter waveplate circular polarization.

Figure 9:
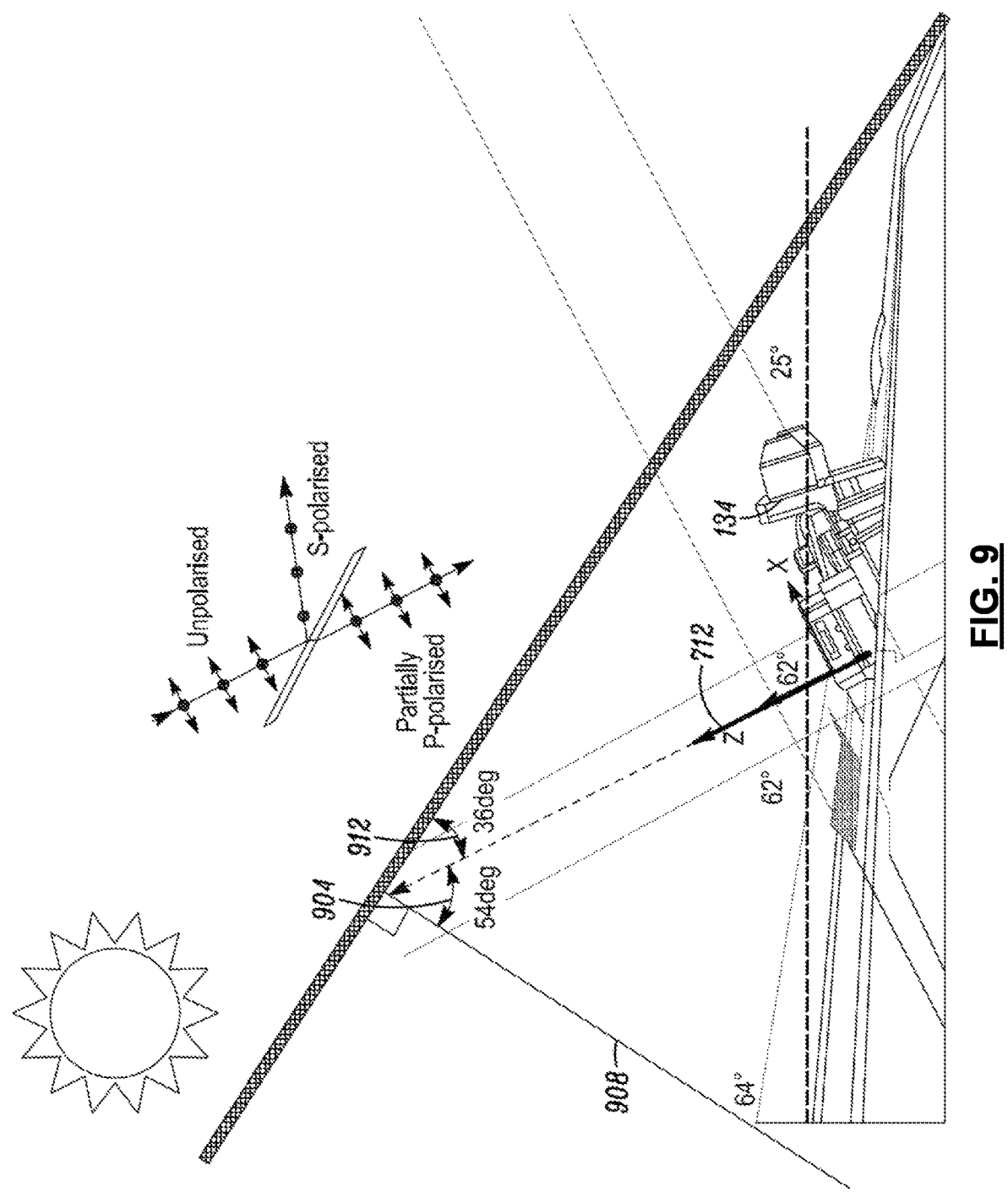
FIG. 9 is a side perspective view including an example implementation of the IR light source viewed from the driver's side of the vehicle.

FIG. 9 is a side perspective view including an example implementation of the IR light source 134 similar to FIG. 7. An angle 904 between the direction 712 of the camera 132 and a line 908 that is perpendicular to the windshield 508 may be approximately 54-64 degrees or another suitable angle. The angle 904 is an angle of incidence (AOI). An angle 912 between direction 712 of the camera 132 and the windshield 308 may be approximately 36 degrees or another suitable angle.

Figure 10:
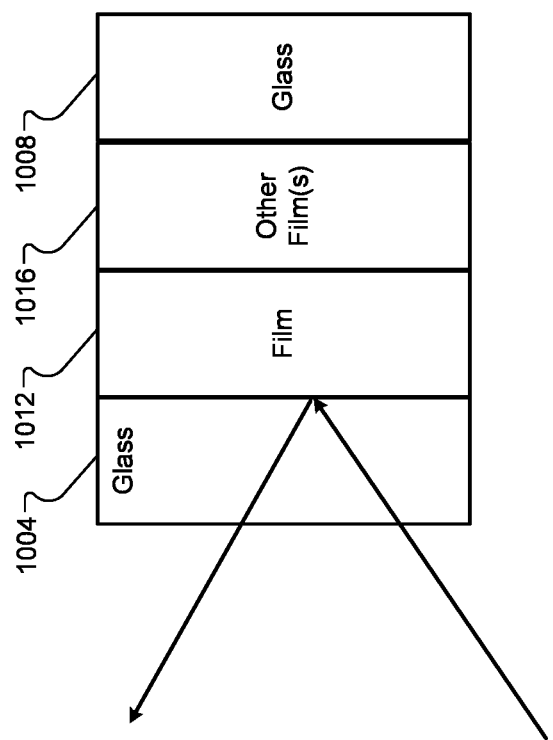
FIGS. 10 and 11 are cross-sectional views of an example implementation of the windshield.

In various implementations, the windshield 508 may include an IR reflective film that reflects light to the camera 132. For example, FIG. 10 is a cross-sectional view of an example implementation of the windshield 508. The windshield 508 may include an inner glass layer 1004 and an outer glass layer 1008.

The IR reflective film may be an optical reflective filter made of a thin film coating on a transparent flexible foil. The IR reflective film filter may enable indirect monitoring of the cabin via the reflection on the windshield.

Figure 11:
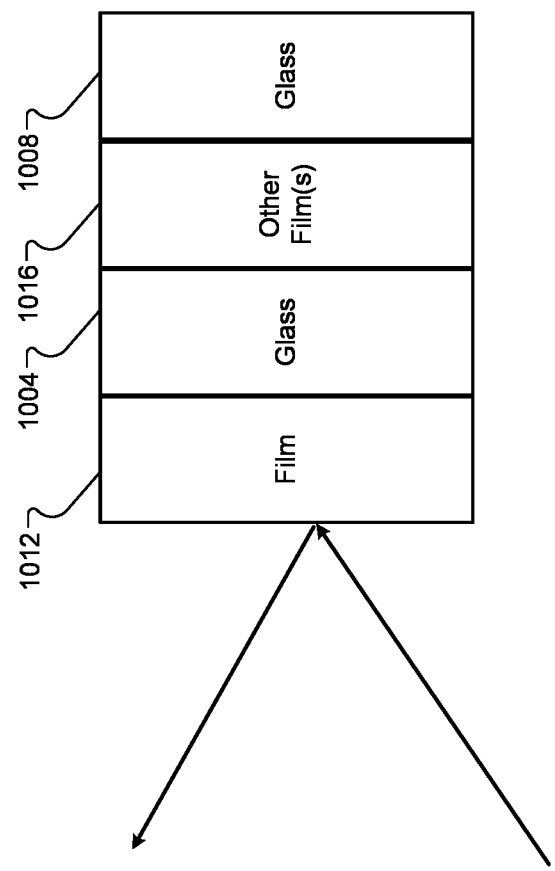

An IR reflective film 1012 may be disposed between the inner glass layer 1008 and the outer glass layer 1008, such as shown in FIG. 10. Alternatively, as illustrated in FIG. 11, the IR film 1012 may be disposed on an inner surface of the inner glass layer 1004 facing the passenger cabin 120. The windshield 508 may also include one or more other films 1016 between the inner and outer glass layers 1004 and 1008. For example, the one or more other films 1016 may include one or more polyvinyl butyral (PVB) films, one or more solar films, such as an ultra clear solar film (UCSF), such as manufactured by 3M, and/or one or more other films.

The IR film 1012 may be configured to reflect near IR light (e.g., 940 nm or 1550 nm) over an approximately 54-64 degree AOI and transmit visible light. The IR film 1012 may have a thickness of approximately 0.2 mm. The IR film 1012 may include a coating for s or p polarized light over the approximately 54-64 degree AOI range. The IR film 1012 may have an R value of at least 80 percent for near IR light (e.g., 940 nm or 1550 nm). The IR film 1012 may have an average temperature T(ave) distribution of at least 90 percent, The IR film 1012 may have an absolute temperature T(abs) distribution of at least 70 percent. Approximately may mean +/−10 percent.

Figure 12:
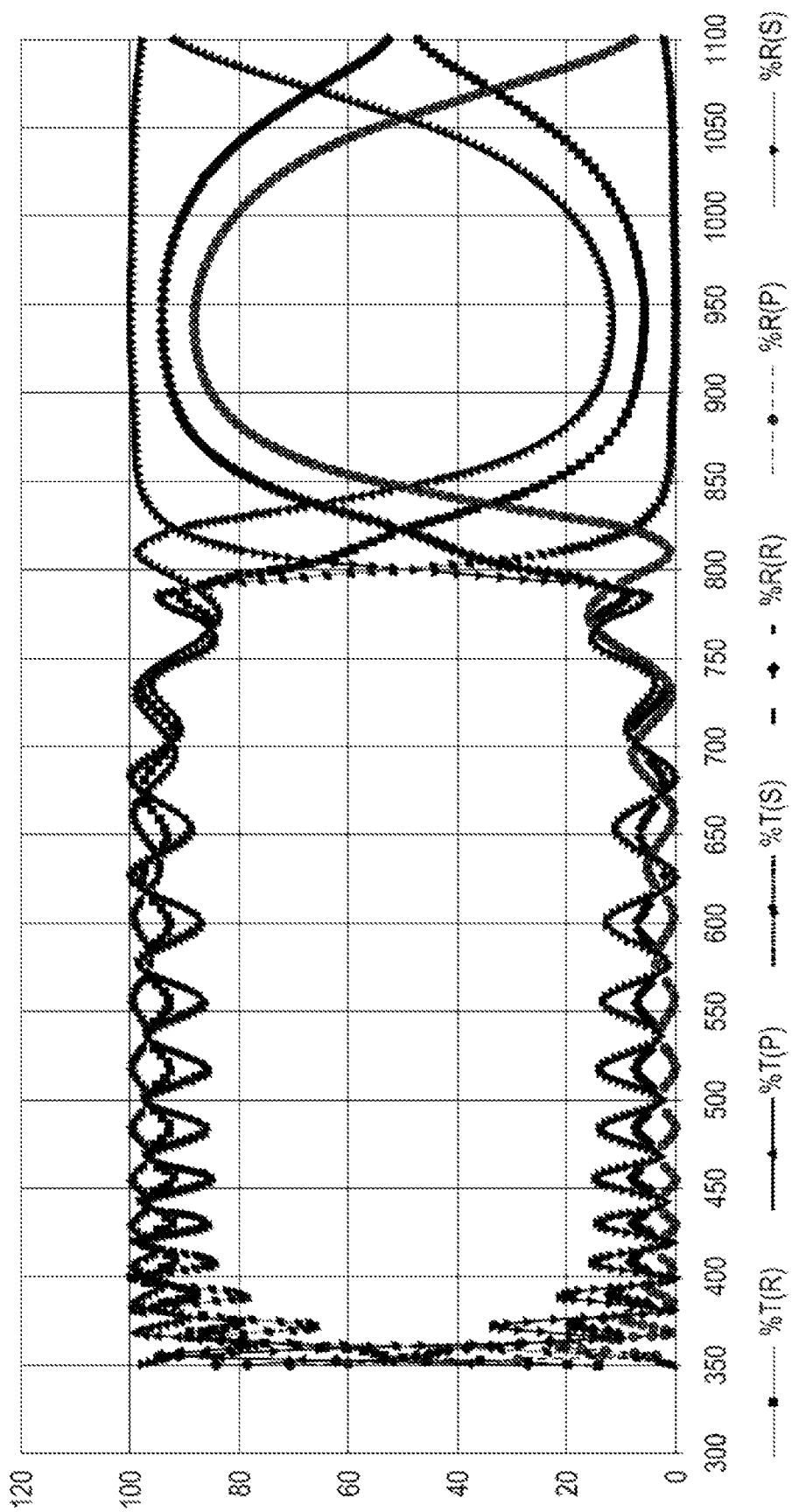
FIG. 12 is an example graph of percentages of light transmitted through an IR film at different wavelengths of light.

FIG. 12 is an example graph of percentages of light transmitted through the IR film 1012 at different wavelengths of light. The IR film 1012 is transmissive (e.g., at least 95%) in the visible light, such as 350-700 nm, but has a high reflectivity (e.g., at least 95%) at approximately 940 nm. The IR film 1012 may have 100 percent reflectivity of s-polarized light with an AOI near the Brewster angle and a t least 90 percent reflectivity of p-polarized light. The IR film 1012 may also reduce dashboard reflection by suppressing S-polarization in the visible spectrum. s and p are the two polarizations. r is the combined resultant of s and p (s+p). T represents transmission, and R represents reflectivity.

The IR film 1012 may be applied to the entire windshield 508 or only over a predetermined area near the camera 132 and the IR light source 134.

The camera 132 being disposed below the dashboard improves styling and also enables a larger optic, improving sensitivity of the camera 132. The camera 132 may also have a narrower field of view than a camera that directly images the passenger cabin. The narrower FOV provides less optical distortion than a wider FOV and allows for a larger aperture. The narrower FOV also reduces a resolution requirement of the camera 132, which may decrease cost.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A driver monitoring system of a vehicle, comprising:
an infrared (IR) camera configured to, via a windshield, capture an image of a driver on a driver's seat within a passenger cabin of the vehicle,
wherein the IR camera is disposed below a top surface of a dashboard of the vehicle and configured to capture the image through an aperture in the top surface of the dashboard that narrows a field of view of the IR camera, and
wherein the IR camera has an angle of incidence of approximately 54-64 degrees with respect to the windshield;
an IR light source configured to transmit IR light directly toward the driver and the driver's seat; and
an IR reflective film disposed on the windshield and configured to reflect light from within the passenger cabin through the aperture toward the IR camera,
wherein the IR film has an R value of at least 80 percent for near IR light.

2. The driver monitoring system of claim 1 wherein the IR light source is disposed at least partially below the top surface of the dashboard.

3. The driver monitoring system of claim 1 wherein the IR film is disposed between inner and outer layers of glass of the windshield.

4. The driver monitoring system of claim 1 wherein the IR film is disposed on an inner surface of an inner layer of glass of the windshield.

5. The driver monitoring system of claim 1 wherein the IR film includes a coating for s-polarized light.

6. The driver monitoring system of claim 1 wherein the IR film includes a coating for p-polarized light.

7. The driver monitoring system of claim 1 wherein the IR camera includes a filter on a lens of the camera.

8. The driver monitoring system of claim 7 wherein the filter includes a p-polarized filter.

9. The driver monitoring system of claim 7 wherein the filter includes quarter waveplate circular polarization.

10. The driver monitoring system of claim 1 further comprising at least one of:
   a second IR light source configured to transmit IR light directly toward the driver and the driver's seat; and
   a third IR light source configured to transmit light indirectly toward the driver via the windshield.

11. The driver monitoring system of claim 1 further comprising:
   a gaze module configured to determine a gaze of the driver based on the image from the IR camera; and
   a monitor module configured to determine whether a location where the gaze of the driver intersects a vertical plane in front of the driver is within an area on the vertical plane.

12. The driver monitoring system of claim 11 wherein:
   the monitor module is configured to increment a timer value when the location where the gaze of the driver intersects the vertical plane in front of the driver is outside of the area on the vertical plane; and
   the driver monitoring system further includes an alert module configured to output an alert to the driver when the timer value is greater than a predetermined value.

13. The driver monitoring system of claim 12 wherein the alert module is configured to at least one of:
   output a visual alert via one or more visual output devices;
   output an audible alert via one or more speakers; and
   output a haptic alert via one or more vibrating devices.

14. A driver monitoring method for a vehicle, comprising:
   by an infrared (IR) camera, via a windshield, capturing an image of a driver on a driver's seat within a passenger cabin of the vehicle,
   wherein the IR camera is disposed below a top surface of a dashboard of the vehicle and configured to capture the image through an aperture in the top surface of the dashboard that narrows a field of view of the IR camera,
   wherein the IR camera has an angle of incidence of approximately 54-64 degrees with respect to the windshield;
   by an IR light source, transmitting IR light directly toward the driver and the driver's seat; and
   by an IR reflective film disposed on the windshield, reflecting light from within the passenger cabin toward the IR camera and through the aperture,
   wherein the IR film has an R value of at least 80 percent for near IR light.

15. The driver monitoring method of claim 14 further comprising:
   determining a gaze of the driver based on the image from the IR camera; and
   determining whether a location where the gaze of the driver intersects a vertical plane in front of the driver is within an area on the vertical plane.

* * * * *